(12) United States Patent
Hanshew et al.

(10) Patent No.: US 7,243,025 B1
(45) Date of Patent: *Jul. 10, 2007

(54) PORTABLE NAVIGATION DEVICE WITH INSTANT ON CONFIGURATION ON NAVIGATIONAL DISPLAY

(75) Inventors: Christopher J. Hanshew, Lenexa, KS (US); Richard J. Haigh, Baldwin City, KS (US); Thomas H. Walters, Gardner, KS (US)

(73) Assignee: Garmin Ltd. (KY)

( * ) Notice: Subject to any disclaimer, the term of this patent is extended or adjusted under 35 U.S.C. 154(b) by 0 days.

This patent is subject to a terminal disclaimer.

(21) Appl. No.: 11/457,283

(22) Filed: Jul. 13, 2006

Related U.S. Application Data

(60) Division of application No. 10/389,467, filed on Mar. 14, 2003, now Pat. No. 7,099,775, which is a continuation-in-part of application No. 10/115,611, filed on Apr. 2, 2002, now Pat. No. 6,795,770.

(51) Int. Cl.
*G01C 21/00* (2006.01)

(52) U.S. Cl. ............... 701/213; 701/25; 701/207; 701/208; 701/209; 340/995.1; 340/905

(58) Field of Classification Search ............... 701/25, 701/207, 208, 209, 212, 213; 340/995.1; 345/905
See application file for complete search history.

(56) References Cited

U.S. PATENT DOCUMENTS

| | | | |
|---|---|---|---|
| 5,542,105 A | 7/1996 | Finch et al. | 455/575.1 |
| 5,640,689 A | 6/1997 | Rossi | 455/575.7 |
| 5,943,018 A | 8/1999 | Miller | 343/702 |
| 5,990,839 A | 11/1999 | Schefte et al. | 343/702 |
| 6,140,970 A | 10/2000 | Ylijurva | 343/702 |
| 6,198,431 B1 | 3/2001 | Gibson | 342/357.07 |
| 6,249,744 B1 | 6/2001 | Morita | 701/213 |
| 6,353,414 B1 | 3/2002 | Jones et al. | 343/702 |
| 6,353,733 B1 | 3/2002 | Murray et al. | 455/90.1 |
| 6,373,430 B1 | 4/2002 | Beason et al. | 342/357.09 |
| 6,407,709 B1 | 6/2002 | Hanshew | 343/702 |
| 6,411,826 B1 | 6/2002 | Camp, Jr. | 455/566 |
| 6,411,899 B2 | 6/2002 | Dussell et al. | 701/211 |

(Continued)

FOREIGN PATENT DOCUMENTS

JP 07-055910 3/1995

OTHER PUBLICATIONS

Handbook for the Palm VII™ Organizer.

*Primary Examiner*—Gertrude A. Jeanglaude
(74) *Attorney, Agent, or Firm*—David L Terrell

(57) ABSTRACT

A multi-function, portable, electronic device includes a housing, a processor located within the housing and a memory in communication with the processor. The electronic device includes a display in communication with the processor and positioned on a surface of the housing. The electronic device includes an apparatus for performing a first function, and an apparatus for performing a second function. One of the functions includes a navigational component. The navigational component includes an antenna attached to the housing and movable between a stowed position and a signal acquisition position. A deployment indicator indicates the antenna is in the signal acquisition position. An operational component of the navigational component is activated in response to the deployment indicator indicating the antenna is in the signal acquisition position.

15 Claims, 12 Drawing Sheets

U.S. PATENT DOCUMENTS

| | | |
|---|---|---|
| 6,415,138 B2 | 7/2002 | Sirola et al. ................ 455/90.1 |
| 6,490,435 B1 | 12/2002 | Ma et al. .................... 455/90.1 |
| 6,501,429 B2 | 12/2002 | Nakamura et al. ........... 343/702 |
| 6,509,876 B1 | 1/2003 | Jones et al. .................. 343/702 |
| 6,518,927 B2 | 2/2003 | Schremmer et al. ......... 701/208 |
| 6,529,824 B1 | 3/2003 | Obradovich et al. ......... 701/208 |
| 6,573,868 B2 | 6/2003 | Johnson et al. .............. 343/702 |
| 6,646,873 B2 | 11/2003 | Chu-Chia et al. ............ 361/686 |
| 6,661,383 B2 | 12/2003 | Sakurai et al. ............... 343/702 |
| 6,694,256 B1 | 2/2004 | Childs et al. ................. 701/209 |
| 6,707,431 B2 | 3/2004 | Byun et al. ................... 343/702 |
| 6,731,753 B2 | 5/2004 | Park et al. .............. 379/433.07 |
| 6,795,770 B1 | 9/2004 | Hanshew et al. |
| 2001/0044321 A1 | 11/2001 | Ausems et al. ................. 45/556 |
| 2001/0050631 A1 | 12/2001 | Takenaga ................ 342/357.13 |
| 2002/0022460 A1 | 2/2002 | Lintern et al. ................. 455/97 |
| 2002/0142799 A1 | 10/2002 | Chu-Chia et al. ............ 455/556 |
| 2003/0064685 A1 | 4/2003 | Kim .............................. 455/90 |
| 2003/0085804 A1 | 5/2003 | Wang ....................... 340/388.1 |
| 2003/0103091 A1 | 6/2003 | Wong et al. .................. 345/863 |
| 2003/0139150 A1 | 7/2003 | Rodriguez et al. ............ 455/90 |
| 2004/0117651 A1 | 6/2004 | Little et al. ................... 713/200 |
| 2005/0024277 A1* | 2/2005 | Hanshew et al. ............ 343/702 |
| 2005/0055161 A1* | 3/2005 | Kalis et al. ................... 701/213 |

* cited by examiner

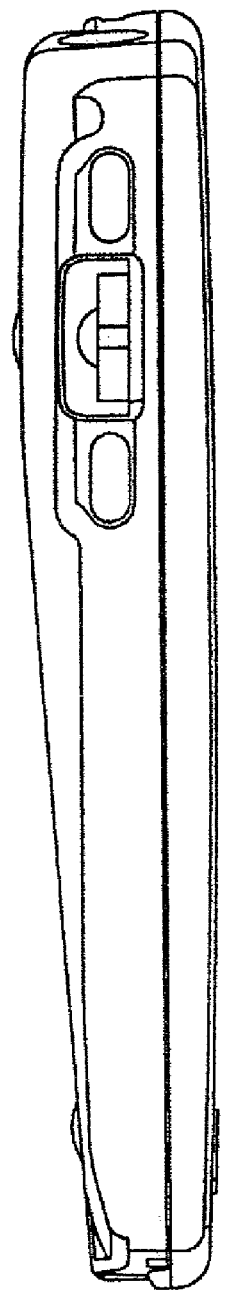
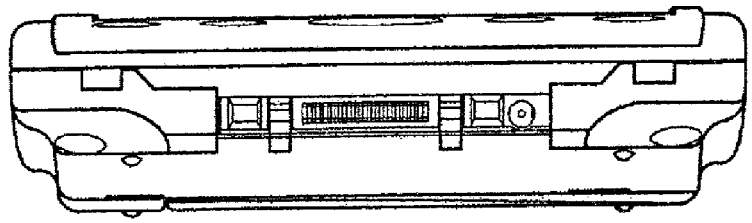
*Fig. 2D*
*Fig. 2E*

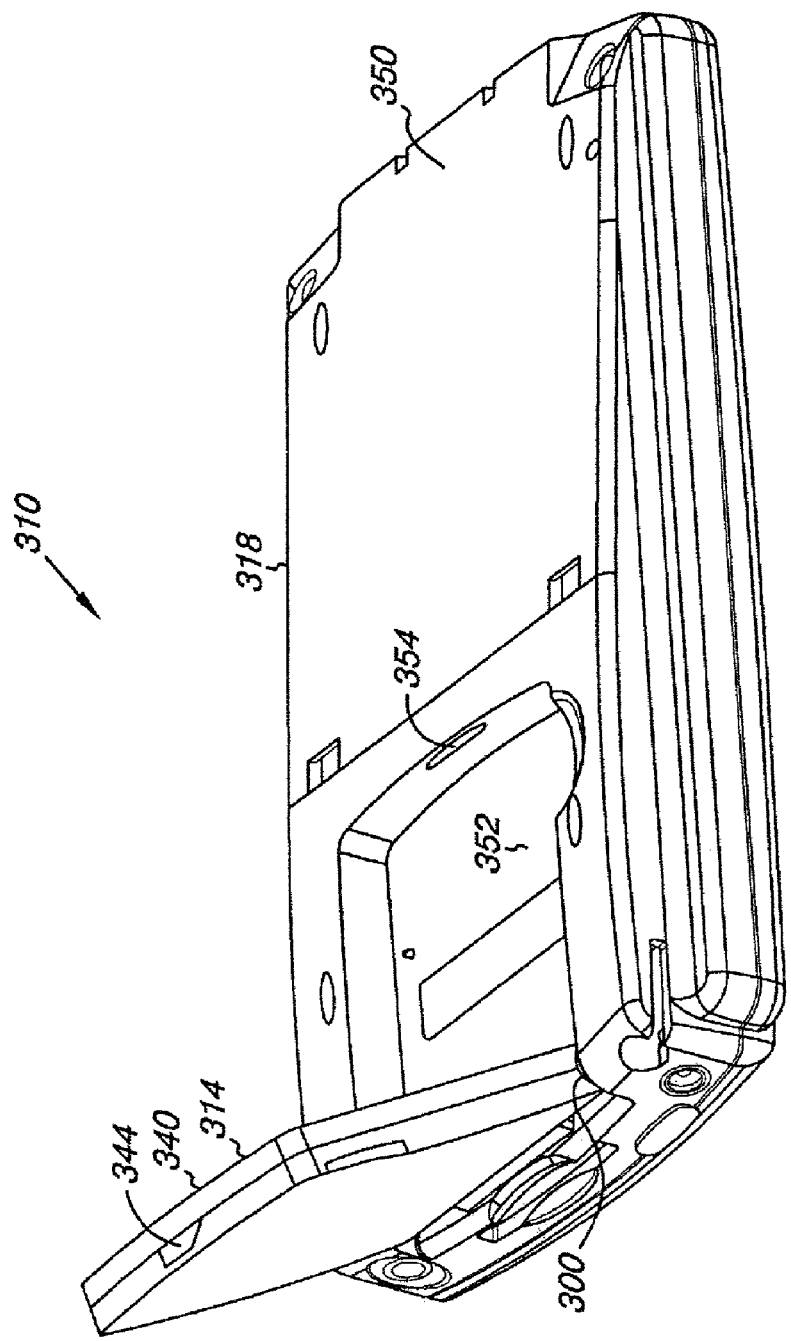

PORTABLE NAVIGATION DEVICE WITH INSTANT ON CONFIGURATION ON NAVIGATIONAL DISPLAY

CROSS-REFERENCE TO RELATED APPLICATIONS

This application claims priority of and is a Divisional of U.S. patent application Ser. No. 10/389,467, filed Mar. 14, 2003 now U.S. Pat. No. 7,099,775, which is a Continuation-in-Part of U.S. patent application Ser. No. 10/115,611, filed Apr. 2, 2002, now U.S. Pat. No. 6,795,770. The specifications of both of the above are incorporated herein by specific reference.

FIELD OF THE INVENTION

The present invention relates generally to navigational devices, and in particular to navigational devices as part of a combined multi-functional system.

BACKGROUND OF THE INVENTION

A natural progression in devices is to build more function or even to combine more functions into one device. In the past ten years, for example, mobile communications, personal data assistants, and portable navigational devices have boomed. Currently, millions use cellular phones on a daily basis. Cellular phones have become so inexpensive that college students can readily afford them. Cellular phones have been given added capability. Some have been provided with paging capability, for example. Recently, cellular phones have been provided with the ability to interface with the internet. Current cell phones also have calendaring capabilities built in and some are now being combined with personal data assistants ("PDAs").

PDAs are now also exceedingly popular. The first PDA-type devices merely held a listing of contacts and may have had a calendar function. Now PDAs, in addition to holding contact data and a calendar, hold e-mail. PDAs have now been provided with the capability to respond to e-mail and are linked or synchronized with a computer periodically so any e-mail answers can be ported over to a computer for sending. Calendar changes are also synchronized.

Navigational devices represent yet another technology that has boomed as of late and which is now becoming popular and affordable. Previously, navigational devices were expensive and far from portable or hand-held. Most navigational devices could only be found on ships and airplanes. Now, navigational devices are popular options in luxury cars and navigational devices have become popular with outdoorsman of all types. Fisherman have them to mark out there favorite fishing holes, for example. These devices have also been combined with other devices, such as depth finders or fish finders which are popular with anglers.

Recently, PDAs and navigational devices, such as global positioning systems ("GPS"), have been combined. There are problems with such combined devices. For example, current combination devices which include a PDA and a GPS are confusing to use. One of the more confusing aspects is switching between the software applications needed for the GPS and the software applications needed for the PDA.

Still another problem is that the GPS or navigational devices generally use more power than other portable technologies that can be included in a portable, electronic device. The hardware needed to acquire signals from satellites is generally much more needy of power than the power needed to keep a cellular phone or a PDA operating. Thus, one of the problems associated with marrying a GPS with another device is that the length between charges for the other device may decline drastically. In other words, the more power hungry GPS portion of a combination device will discharge the batteries faster than a separate PDA, cellular phone or other device.

There are also problems with maintaining a relatively small size while still having the necessary capability to acquire the satellite signals needed to determine position on the GPS portion of the device. A GPS generally needs a fairly substantial antenna. Incorporating the antenna into the housing of a combined GPS and PDA may wreck havoc with the size of the device. As a result, all combination models are provided with an external GPS antenna. Using a patch antenna in such hand-held devices is advantageous since these are more low profile. However, there is a problem with fixing the antenna into a device since the antenna is generally most effective orientated a specific way with the satellites rather than oriented with respect to a housing or the case of the combined device. For example, a patch antenna is most effective if it is essentially parallel with the earth. Many of the housings are made to be used in a hand-held mode. When holding the housing the housing is generally horizontally orientated. If a hand-held unit is to be mounted in an automobile, the mounting orientation is limited to more horizontal orientations so that the antenna is effective. A large problem with mounting a device with a fixed antenna so that the antenna is effective at receiving GPS signals generally makes the display almost impossible for the driver to see. As a result, an antenna fixed with respect to the housing may suffer in one use as compared to another. Providing a movable antenna also presents the problems of keeping the antenna at a position, especially in a vibrating environment such as driving down a dusty washboard gravel road.

There is always a problem with carrying separate devices. Each one needs a power cord, different batteries and other different accessories. So there is always a need for combined functions in one device. What is needed is a portable, hand-held electronic device that is user friendly and generally easy to use. For example, one that switches from one application to another with ease or even automatically. What is also needed is a device that includes a power savings mode so that the user is not continually recharging the device rather than using it. There is still a further need for a device that is small enough that it is handy to use and store in a pocket or purse. There is also a need for a device that minimizes the number of auxiliary accessories that must be carried. Specifically, there is also a need for a device that includes a GPS or other navigational device with other devices. Such a device needs an antenna which is part of the device but which is also positionable to more than one position. Also needed is a device which can operate in a hand-held orientation or in a car-mounted orientation. The device also needs to be neat and which is free of wires routed externally about the housing. The device also needs to be durable. There is also a need for a navigational route planning device which rapidly and efficiently generates a route plan, especially when a route was not completed.

SUMMARY OF THE INVENTION

A portable electronic device includes a housing, a processor located within the housing, a memory in communication with the processor, and a display in communication with the processor. The display is positioned on a surface of the housing. The portable electronic device has a first component, and a second component. One of the first and second components include a navigational component. The navigational component further includes an antenna attached to the housing. The antenna is a patch antenna having a width of about 1 inch and a length of about 1 inch. The antenna is movable between a stowed position and a signal acquisition position. The navigational component has a deployment indicator which indicates the antenna is in the signal acquisition position. The navigational component also includes an operational component which is activated in response to the deployment indicator indicating the antenna is in the signal acquisition position. In some embodiments, the operational component includes a global position information acquisition component which is enabled in response to the deployment indicator indicating the antenna is in the signal acquisition position. The operational component includes a set of instructions executable by the processor for processing signals acquired by the antenna. The set of instructions is enabled when the deployment indicator indicates the antenna is in the signal acquisition position. The set of instructions is disabled in response to the deployment indicator indicating the antenna has been moved from the signal acquisition position to the stowed position. The display switches to the user interface associated with the navigational component in response to the deployment indicator indicating the antenna is in the signal acquisition position. The navigational component is a positioning system which uses at least three signals to triangulate a position, such as a GPS.

Also disclosed is a navigation system which includes a mass storage device adapted to store navigation data, a server adapted to communicate with the mass storage, and the portable, multi-function electronic device discussed in the previous paragraph. The navigational device has an operational component which is activated in response to the deployment indicator indicating the antenna is in the signal acquisition position. The operational component includes a power savings mode which is enabled in response to the deployment indicator indicating that the antenna position has been changed to the stowed position from the signal acquisition position. The power savings mode includes halting a signal acquisition process. The operational component includes a set of software instructions executed by the processor or hardwired combinatorial logic.

Advantageously, the invention provides for a device having a navigational component and one or more other functions, such as a PDA function or a cellular phone function. The portable, hand-held electronic device is user friendly since one function switches to another essentially automatically. The portable, hand-held electronics device includes a power savings mode so that the user is not continually recharging the device rather than using it. The device is small enough to be handy to use and stores in a pocket or purse. The device includes a GPS or other navigational device with other devices. The GPS antenna is low profile and is positionable to more than one position so that the device can operate in a hand-held orientation or in a car-mounted orientation. The device is durable, and free of wires routed externally about the housing. Routing the connector between the antenna and hardware within the case provides for a neat, uncluttered design.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 2D illustrates a side view of the embodiment of a hand-held, multi-function electronic device shown in FIG. 2A. The side view shown in FIG. 2D is the side opposite the side shown in FIG. 2B;

FIG. 2E illustrates end view of the embodiment of a hand-held, multi-function electronic device shown in FIG. 2A. The end view shown in FIG. 2E is the end opposite the end shown in FIG. 2C;

FIG. 3 is a perspective view of the back of the hand-held, multi-function electronic device shown in FIGS. 2A-2C and illustrates the movable patch antenna in one open position;

FIG. 9 is a cross-sectional view along line 9-9 of FIG. 8.

DETAILED DESCRIPTION OF THE INVENTION

Figure 1:
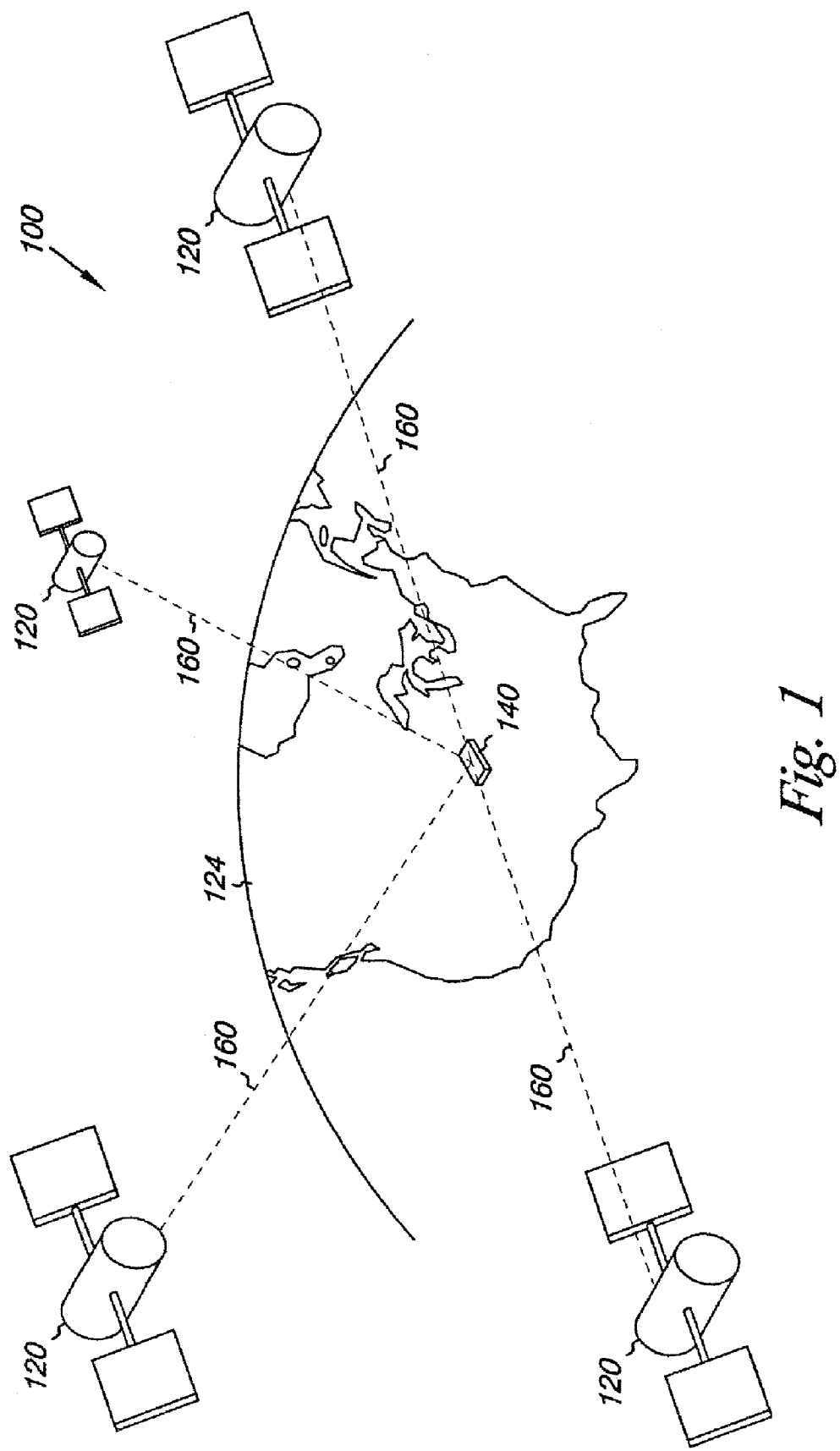
FIG. 1 is a representative view of a Global Positioning System (GPS)

In the following detailed description of the invention, reference is made to the accompanying drawings which form a part hereof, and in which is shown, by way of illustration, specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense, and the scope of the present invention is defined only by the appended claims, along with the full scope of equivalents to which such claims are entitled.

The following description and figures use a reference numeral convention where the first digit of the reference numeral corresponds to the figure and the following two digits correspond to like elements throughout the specification. For example, the housing of a portable, hand-held, electronic device of the present invention has a reference number of 218, 318, 418, 518 etc., corresponding to the housing X18 in FIGS. 2, 3, 4, 5, etc. where X is the number of the figure in which the reference numeral appears.

One type of navigational system includes Global Positioning Systems (GPS). Such systems are known and have a variety of uses. In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits. Based on these precise orbits, GPS satellites can relay their location to any number of receiving units.

The GPS system is implemented when a device specially equipped to receive GPS data begins scanning radio frequencies for GPS satellite signals. Upon receiving a radio signal from a GPS satellite, the device can determine the precise location of that satellite via one of different conventional methods. The device will continue scanning for signals until it has acquired at least three different satellite signals. Implementing geometrical triangulation, the receiver utilizes the three known positions to determine its own two-dimensional position relative to the satellites. Additionally, acquiring a fourth satellite signal will allow the receiving device to calculate its three-dimensional position by the same geometrical calculation. The positioning and velocity data can be updated in real time on a continuous basis by an unlimited number of users.

In fact, although GPS enabled devices are often used to describe navigational devices, it will be readily appreciated that satellites need not be used at all to determine a geographic position of a receiving unit, since cellular towers or any customized transmitting radio frequency towers can be deployed and combined in groups of three or more. With such a configuration, any standard geometric triangulation algorithm can be used to determine the exact location of the receiving unit. In this way, personal hand-held devices, cell phones, intelligent appliances, intelligent apparel, and others can be readily located geographically, if appropriately equipped to be a receiving unit.

FIG. 1 shows one representative view of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A Device that includes a GPS receiver 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the Device that includes a GPS receiver 140 must acquire spread spectrum GPS satellite signals 160 from at least three satellites 120 for the Device that includes a GPS receiver 140 to calculate its two-dimensional position by triangulation. Acquisition of an additional signal 160, resulting in signals 160 from a total of four satellites 120, permits Device that includes a GPS receiver 140 to calculate its three-dimensional position.

Of course as previously presented and as is readily appreciated by those skilled in the art, GPS satellites and GPS receiving devices are not required by the tenets of the present invention, since any receiving device capable or receiving the location from at least three transmitting locations can perform basic triangulation calculations to determine the relative position of the receiving device with respect to the transmitting locations.

For example, at least three cellular towers can each transmit their location information to a receiving cellular phone, or any other receiving device, and if the phones or devices are equipped to perform the triangulation algorithm, then the location of the cellular phone or device can be readily resolved. By further way of example, an amusement park or entertainment facility can deploy three or more transmitting radio frequency devices and provide users with receiving units capable of performing a triangulation algorithm to determine the receiving unit's location within the amusement park or entertainment facility. In this way, it is readily apparent that a receiving unit need not be exclusively GPS enabled to benefit from the teachings of the present invention.

Figures 2A, 2B, 2C:
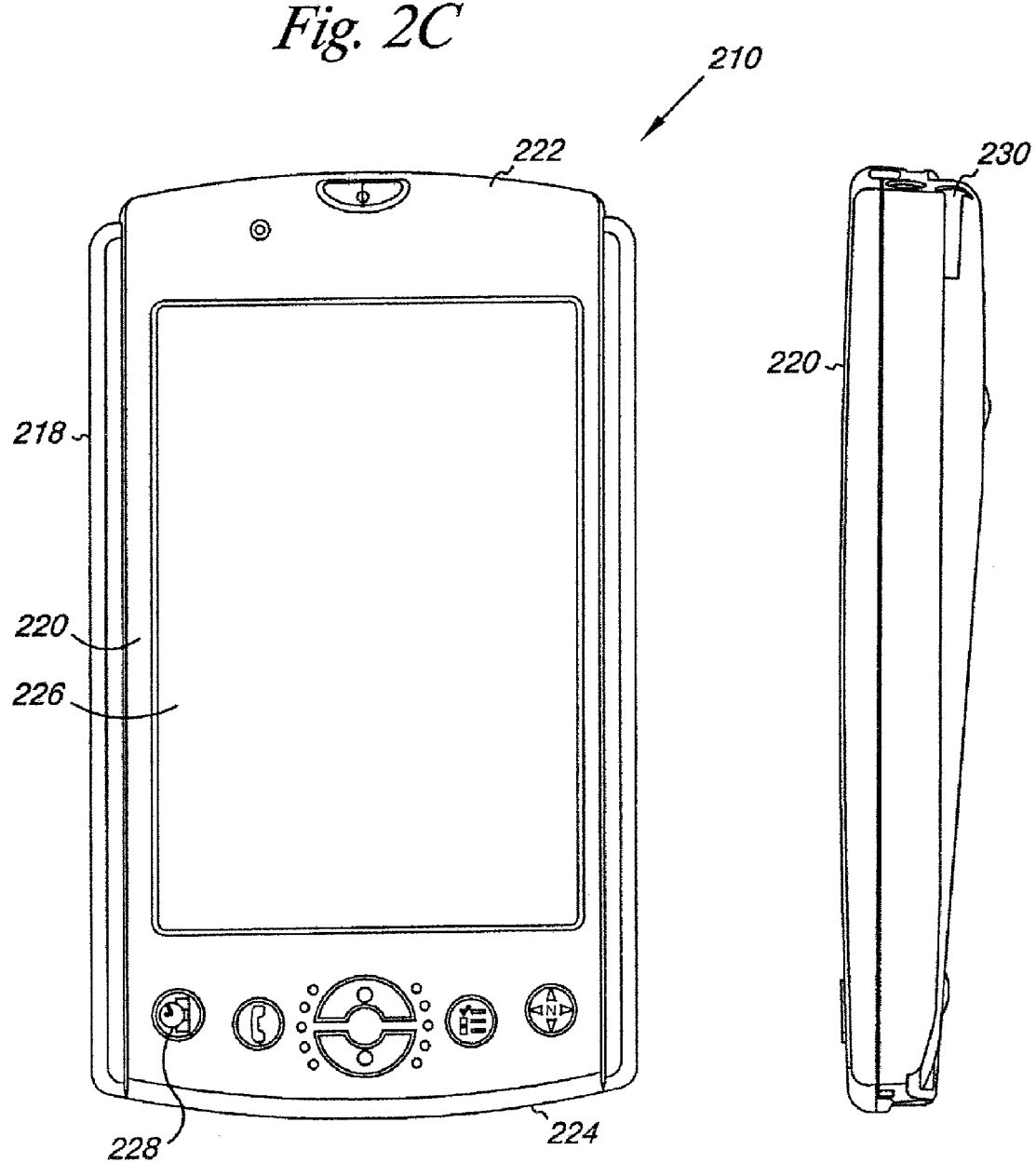
FIG. 2A illustrates a top view of an embodiment of a hand-held, multi-function electronic device that includes a navigation component device according to the teachings of the present invention.
FIG. 2B illustrates side view of the embodiment of a hand-held, multi-function electronic device shown in FIG. 2A.
FIG. 2C illustrates end view of the embodiment of a hand-held, multi-function electronic device shown in FIG. 2A.

FIGS. 2A-2E illustrate views of one embodiment of an electronic navigational device 210 according to the teachings of the present invention. FIGS. 2A-2E illustrate the top surface of the navigational device, a side view and an end view of the navigational device 210. The navigational device 210 shown in FIGS. 2A-2E includes a personal digital assistant ("PDA") with integrated GPS receiver according to the teachings of the present invention. The GPS integrated PDA operates with an operating system ("OS") such as, for example, the well-known Palm or Pocket PC operating systems, or the lesser-used Linux OS. The GPS integrated PDA 210 can also include other devices contained in a housing 218, such as an internal cellular transceiver. The GPS integrated PDA 210 also includes an integrated GPS patch antenna 214. The patch antenna 214 is housed within a subhousing 240 which moves or flips with respect to the housing 218 (the movement of the subhousing will be detailed in FIGS. 3-9). The housing 218 is generally rectangular with a low profile and has a front face 220 extending from a top end 222 to a bottom end 224. Visible through front face 220 is a display screen 226, which is touch sensitive and responsive to a stylus 230 (shown stored in the side view of FIG. 2B) or a finger touch. FIGS. 2A-2E illustrate the stylus 230 nested within housing 218 for storage and convenient access in a conventional manner. The embodiment shown in FIG. 2A illustrates a number of control buttons, or input keys 228 positioned toward the bottom end 224. The invention, however, is not so limited by the position of the control buttons. It should be noted that the input keys 228 can be positioned toward the top end 222 or at any other suitable location. The end view of FIG. 2C illustrates a map data cartridge bay slot 232 and headphone jack 234 provided at the top end 222 of the housing 218. Again, it should be noted that a map data cartridge bay slot 232 and headphone jack 234 could also be provided at the bottom end 224, separately at opposite ends, or at any other suitable location.

FIG. 2D illustrates another side view of the embodiment of a hand-held, multi-function electronic device shown in FIG. 2A. The side view shown in FIG. 2D is the side opposite the side shown in FIG. 2B. FIG. 2E illustrates another end view of the embodiment of a hand-held, multi-function electronic device shown in FIG. 2A. The end view shown in FIG. 2E is the end opposite the end shown in FIG. 2C.

It should be understood that the structure of GPS integrated PDA 210 is shown as illustrative of one type of integrated PDA navigation device. Other physical structures, such as a cellular telephone and a vehicle-mounted unit are contemplated within the scope of this invention.

FIG. 3 is a perspective view of the back surface 350 of the electronic navigational device 310 shown in FIGS. 2A-2C. As shown in FIG. 3, the subhousing 340 which includes the antenna 314, has been moved or flipped to an open position where the subhousing 340 makes approximately a 110° angle with respect to the back surface 350 of the navigational device 310. The patch antenna 314 is contained within the subhousing 340. The subhousing 340 and contained patch antenna 314 rotate upon a hinge 300 which will be further detailed with respect to FIGS. 5 and 8. The hinge allows the subhousing 340 to be open to one of many positions. However, the hinge itself, includes a feature which allows the subhousing 340 to preferentially stop at one of two positions. In the first position, shown in FIG. 3, the subhousing makes approximately a 110° angle with respect to the back surface 350 of the navigational device 310. This orientation is needed when the navigational device 310 is to be mounted within a car. It should be noted that the patch antenna 314, in order to be most effective, has to essentially be parallel to the surface of the earth. When the PDA or navigational device 310 that includes a PDA is mounted in an automobile, the orientation shown in FIG. 3 results in the patch antenna 314 housed within the subhousing 340 to be essentially parallel to the surface of the earth to provide for reception of radio signals from one of several satellites used in a GPS system. The housing 318 includes a cavity or depression 352 which corresponds to the size of the subhousing 340. The cavity or depression 352 also includes a latch 354 for catching a mating feature 344 on the subhousing 340 when the subhousing 340 is stowed within the housing 318. Also shown in FIG. 3 is a plunger 622 which is discussed in further detail in the description of FIG. 6 below.

Figure 4:
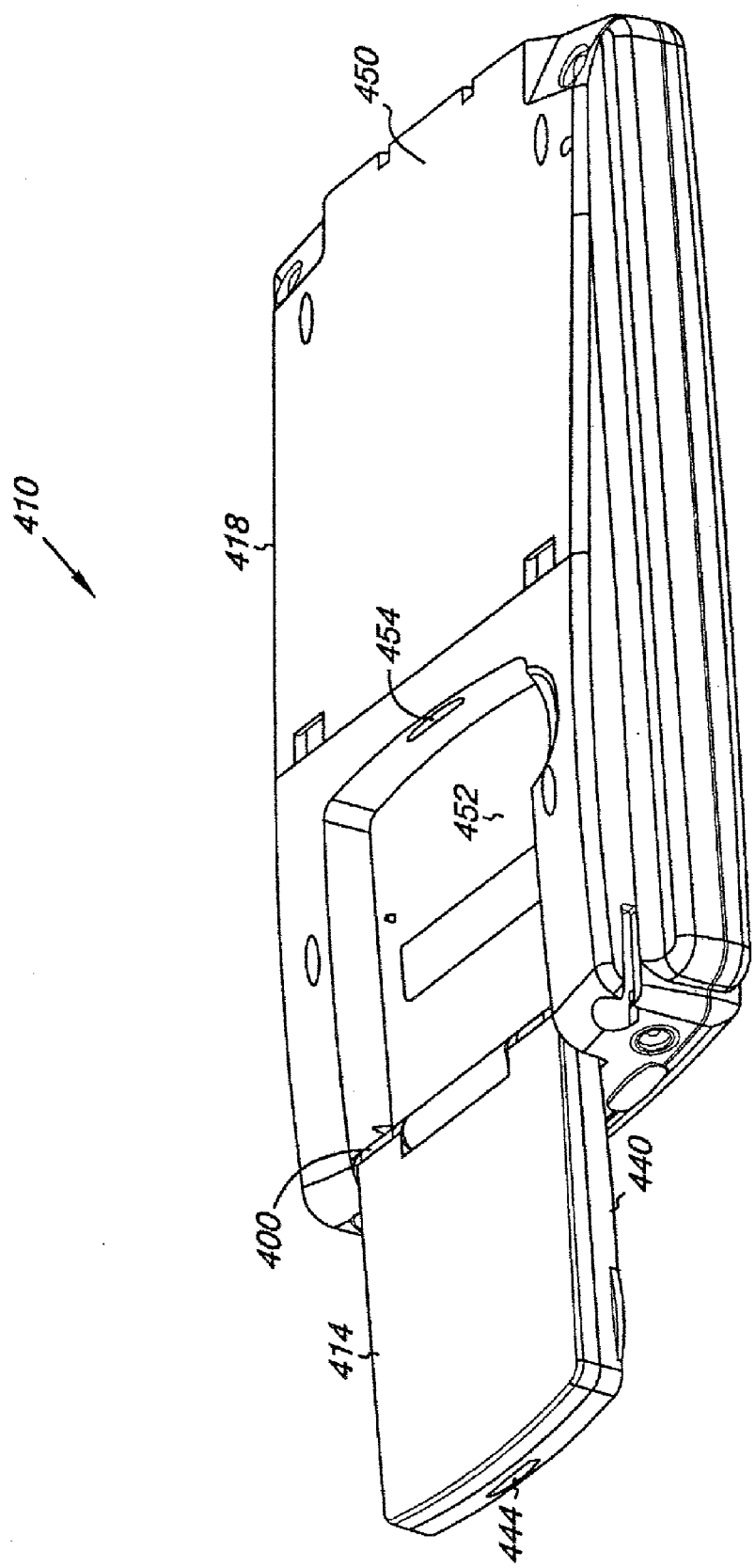
FIG. 4 is a perspective view of the back of the hand-held, multi-function electronic device shown in FIGS. 2A-2C and illustrates the movable patch antenna in another open position.

FIG. 4 shows a perspective view of the back of a hand-held multi-functional electronic device 410 as shown in FIGS. 2A-2C, with the movable subhousing 440 and enclosed patch antenna 414 in another open position. As shown in FIG. 4, the subhousing 440 has moved through approximately 180° and is essentially flat with respect to the back surface 450 of the navigational device or multi-functional electronic device 410. Again, noting that the patch antenna, in order to be most effective, has to essentially be parallel with respect to the surface of the earth, this particular orientation of the patch antenna 414 provides for effective reception of radio signals from satellite antennas when the navigational device is used in a hand-held mode. In other words, when a user is holding a multi-functional electronic device that includes a navigational device 410, the user generally holds the PDA-shaped device in a orientation that is essentially flat or parallel to the surface of the earth. Therefore, the subhousing 440, including the patch antenna 414, is flipped to a position where both the housing 418 and the subhousing 440 are essentially parallel to the surface of the earth. As mentioned previously, the subhousing 440 is attached to the housing 418 with the hinge 400. The hinge 400 has several preferred open positions which are shown in FIGS. 3 and 4. The housing 418 includes a cavity or depression 452 which corresponds to the size of the subhousing 440. The cavity or depression 452 also includes a latch 454 for catching a mating feature 444 on the subhousing 440. It should be noted that having two preferred open positions so that the patch antenna is always substantially parallel with the surface of the earth or perpendicular to the signals from the satellites provides for the best possible reception of the signals from the satellite. By having the subhousing capable of more than one orientation and actually going to one of two preferred orientations, the patch antenna 414 can be made somewhat smaller than a patch antenna having a fixed orientation with respect to a housing. In this particular application, the patch antenna is approximately 20 mm and fits within the housing 440.

Figure 5:
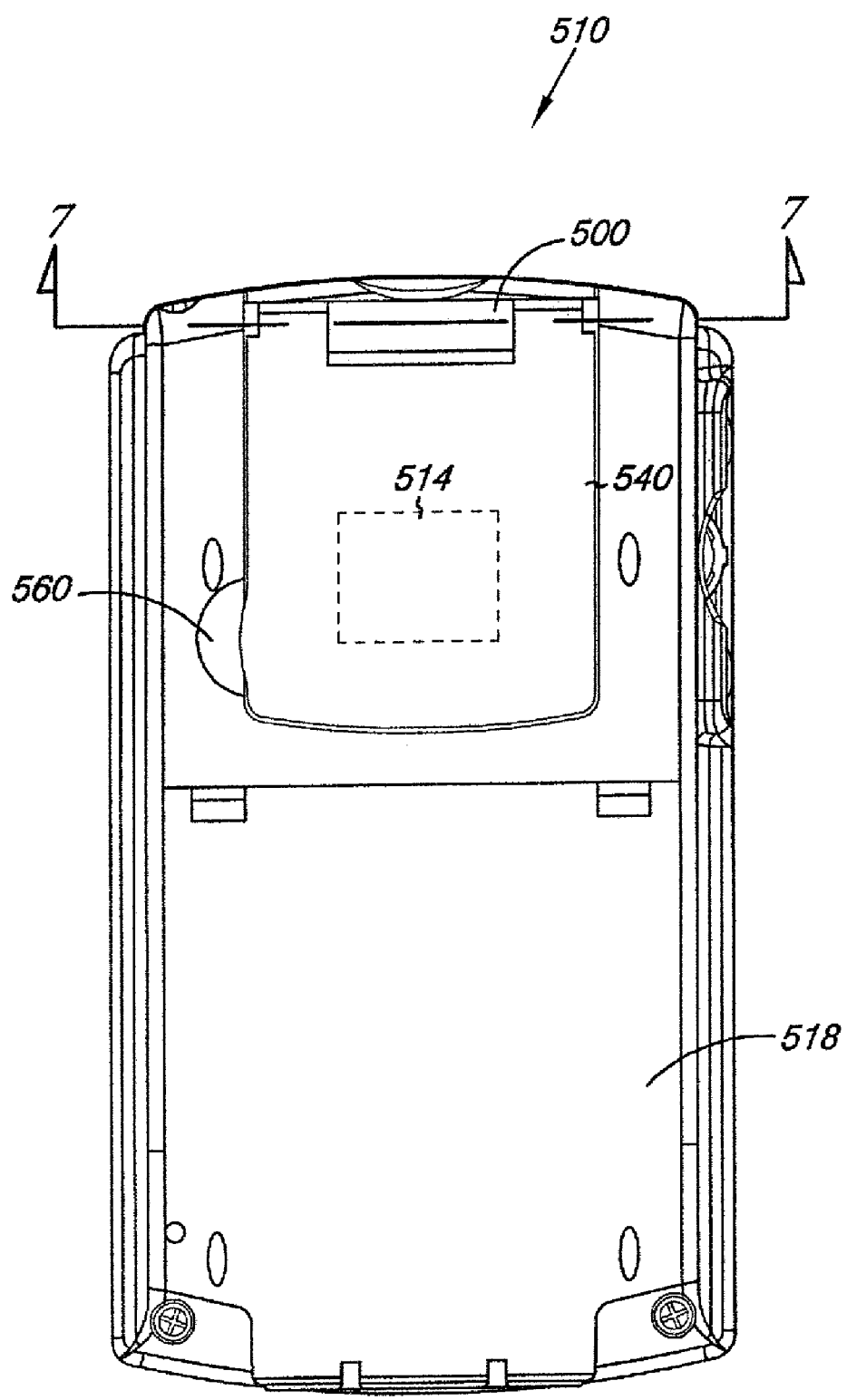
FIG. 5 is a back view of the hand-held, multi-function electronic device shown in FIGS. 2A-2C with the movable patch antenna in a closed position.

FIG. 5 is a back view of a hand-held multi-functional electronic device 510 with the movable subhousing 540 in a closed position. A hinge 500 allows the subhousing 540 to move with respect to the housing 518. In the closed position, the latch opening and the latch are engaged (shown in FIGS. 3 and 4 as elements 344, 354 and 444, 454). In various embodiments, the latch and the latch opening are engaged with a snap fit between housing 518 and the subhousing 540. The invention, however, is not so limited. In various embodiments, the housing 518 also includes an access depression 560. The access depression 560 allows access to below the surface of the subhousing 540 such that an edge of the subhousing can be reached and such that the subhousing 540 can be moved from the closed position shown in FIG. 5 to an open position such as those shown in FIGS. 3 and 4. It should be noted that the closed position may also be referred to as a stowed position.

Figure 6:
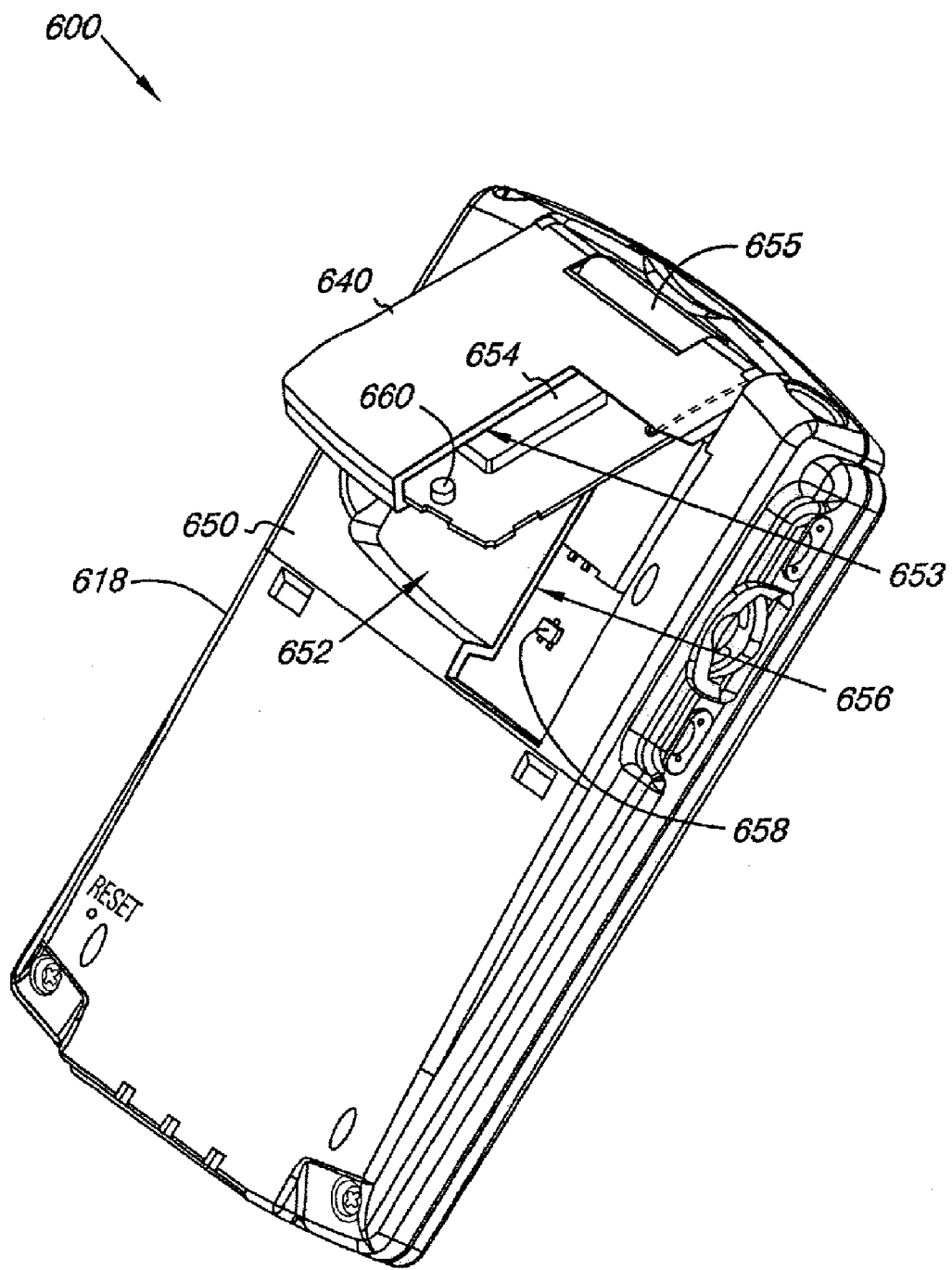
FIG. 6 illustrates a perspective view of a multi-functional electronic device 600 according to various embodiments of the present invention.

FIG. 6 illustrates a perspective view of a multi-functional electronic device 600 according to various embodiments of the present invention. As shown in the embodiment of FIG. 6, a housing 618 and a subhousing 640 are associated with the multi-functional electronic device 600. As noted above, in various embodiments, the multi-function electronic device 600 includes a hand held PDA 600 having integrated GPS capabilities. The perspective view embodiment of FIG. 6 illustrates a back surface 650 of the housing 618. In addition, a depression, or indentation 652 is illustrated in the back surface 650 of the housing 618. As one of ordinary skill in the art will appreciate upon reading this disclosure, in various embodiments the indentation 652 is configured so that the subhousing 640 can seat flushly into the back surface 650 of the housing 618 when the subhousing 640 is in a first, or stowed position.

As one of ordinary skill in the art will appreciate upon reading this disclosure, in the various embodiments the subhousing 640 includes a flip-up antenna which is pivotally attached at 655 to the housing 618. In various embodiments, as has been described herein, the subhousing 640 includes a GPS antenna as the same will be known and understood by one of ordinary skill in the art. In the embodiment of FIG. 6, the GPS antenna is shown as 654 in a cut-away section view 653. In various embodiments, the subhousing 640 includes a patch GPS antenna 654 as the same will be known and understood by one of ordinary skill in the art. The invention, however, is not limited to a patch GPS antenna in the subhousing 640. Other suitable types of GPS antennas, located in the subhousing 640 are also considered within the scope of the present invention.

The embodiment of FIG. 6 further illustrates another cut-away section view 656 provided to reveal one or more components located beneath the indentation 652 which receives the subhousing 640. As shown in the embodiment of FIG. 6, the one or more components revealed in the cut-away 656 beneath the indentation 652 includes at least one component 658 which is part of a Hall Effect switch as the same will be known and understood by one of ordinary skill in the art. In various embodiments, the at least one component 658 located beneath the indentation 652 includes the detection mechanism 658 of a Hall Effect switch as the same will be known and understood by one of ordinary skill in the art. That is, the component 658 can be a sensor operable to detect the presence of a magnetic field. In this configuration, and as shown in the embodiment of FIG. 6, the subhousing 640 includes a magnet 660 located within the subhousing 640 and positioned to oppose the detection mechanism 658 when the subhousing 640 is in a first, or stowed position (as shown in FIG. 5). Other configurations and placement embodiments are considered within the scope of the present invention.

As one of ordinary skill in the art will appreciate upon reading this disclosure, when the subhousing 640 is in a first, or stowed position (as shown in FIG. 5) a magnetic field produced by the magnet 660 can trigger the detection mechanism 658 and register a first state and/or produce a first signal representative of the positioning of the subhousing 640, e.g. in a collapsed, closed or stowed position. Likewise, as one of ordinary skill in the art will appreciate, when the subhousing 640 is in one or more second positions (such as illustrated in FIGS. 3 and 4) a magnetic field produced by the magnet 660 can be sufficiently removed, or distanced, from the detection mechanism 658 such that the detection mechanism can register a second state and/or produce a second signal representative of the positioning of the subhousing 640, e.g. in an open, extended, expanded, or flipped-up location in the one or more second positions.

As one of ordinary skill in the art will appreciate upon reading this disclosure, the Hall Effect switch components described above, e.g. 658 and 660, are but one form of detect switch which can be implemented with the various embodiments of the present invention to provide an indication of a location and/or position of the subhousing 640. Embodiments of the invention are not limited to Hall Effect switches as the sole means for detecting the position of the subhousing 640.

As noted above, however, various embodiments include a Hall Effect switch mechanism to indicate a position or location of the subhousing 640. By way of example and not by way of limitation, a Hall Effect switch, including components 658 and 660, have been shown to register a first state and/or produce a first signal when the subhousing 640 is in the first, or stowed position. Likewise, the Hall Effect switch embodiment of FIG. 6, has been shown to register a second state and/or produce a second signal when the subhousing is in one or more second positions (such as shown in FIGS. 3 and 4). As one of ordinary skill in the art will appreciate upon reading this disclosure, in various embodiments the first and/or second registered states as well as the first and/or second signals can be received and/or detected by other components, operated upon by one or more sets of computer executable instructions to interact with, initiate and/or control other functions within the PDA 600.

In various embodiments, by way of example and not by way of limitation, when the subhousing is in the first, or stowed position, the first registered state and/or first signal produced by the Hall Effect switch embodiment of FIG. 6 can function to cease providing power to a GPS receiver (e.g. as described in connection with FIG. 10) and the GPS antenna 654. In various embodiments, this feature can function as a power savings mode. In various embodiments, the first registered state and/or first signal produce by the Hall Effect switch can be received and/or detected by other components as well as operated upon by one or more sets of computer executable instructions to cause the PDA to automatically transition to one or more PDA functions available on PDA 600. For example, upon registering a first state and/or producing a first signal from the Hall Effect switch, the PDA 600 can in various embodiments automatically transition to a calendar function, a to-do list function, and/or an address book function, among others. In various embodiments, the first state and/or first signal can cause the PDA 600 to transition to a pre-defined and/or pre-selected interface for one or more PDA functions. The invention, however, is not limited to the aspects and features presented above.

In a similar manner, in various embodiments by way of example and not by way of limitation, when the subhousing is positioned in one or more second positions (as shown in FIGS. 3 and 4), a second registered state and/or second signal produced by the Hall Effect switch embodiment of FIG. 6 can function to provide power to a GPS receiver (e.g. as described in connection with FIG. 10) and the GPS antenna 654. In various embodiments, this feature can function as a power savings mode to provide power to the GPS receiver and antenna combination only when they are intended for use. In various embodiments, the second registered state and/or second signal produce by the Hall Effect switch can be received and/or detected by other components as well as operated upon by one or more sets of computer executable instructions to cause the PDA 600 to automatically transition to one or more navigation functions available on PDA 600. For example, upon registering a second state and/or producing a second signal from the Hall Effect switch, the PDA 600 can in various embodiments automatically transition to a routing function, a locating function, and/or a tracking function, among others. In various embodiments, the second state and/or second signal can cause the PDA 600 to transition to a pre-defined and/or pre-selected interface for one or more navigation functions. The invention, however, is similarly not limited to the aspects and features presented above. As one of ordinary skill in the art will appreciate upon reading this disclosure, a detection mechanism, whether a Hall Effect switch or otherwise, is included in various embodiments of the present invention to activate one or more hardware and/or software components of the PDA 600 as the same are described herein.

In various embodiments, in addition to enabling software, a microprocessor (as discussed in connection with FIG. 10) can remember selected preferences of a user. For example, the user may use a specific graphical user interface more often than other graphical user interfaces available for the software component of the navigational component of the PDA 600. The scope of the embodiments of the invention provide for operating systems which can run several software applications simultaneously, e.g. so that the software that is not primarily being used at the time on the PDA 600 can run in the background rather than being totally turned off or not run. In various embodiments, a feature of automatically switching to the software application that is most likely to be used makes for very simple operation. In embodiments with a position detection mechanism, such as described in the embodiment of FIG. 6, a state and/or signal can indicate which particular function is most likely to be used and software applications can be switched automatically so that a user does not have to be involved with switching the software functions and selecting new graphical user interfaces.

Figure 7:
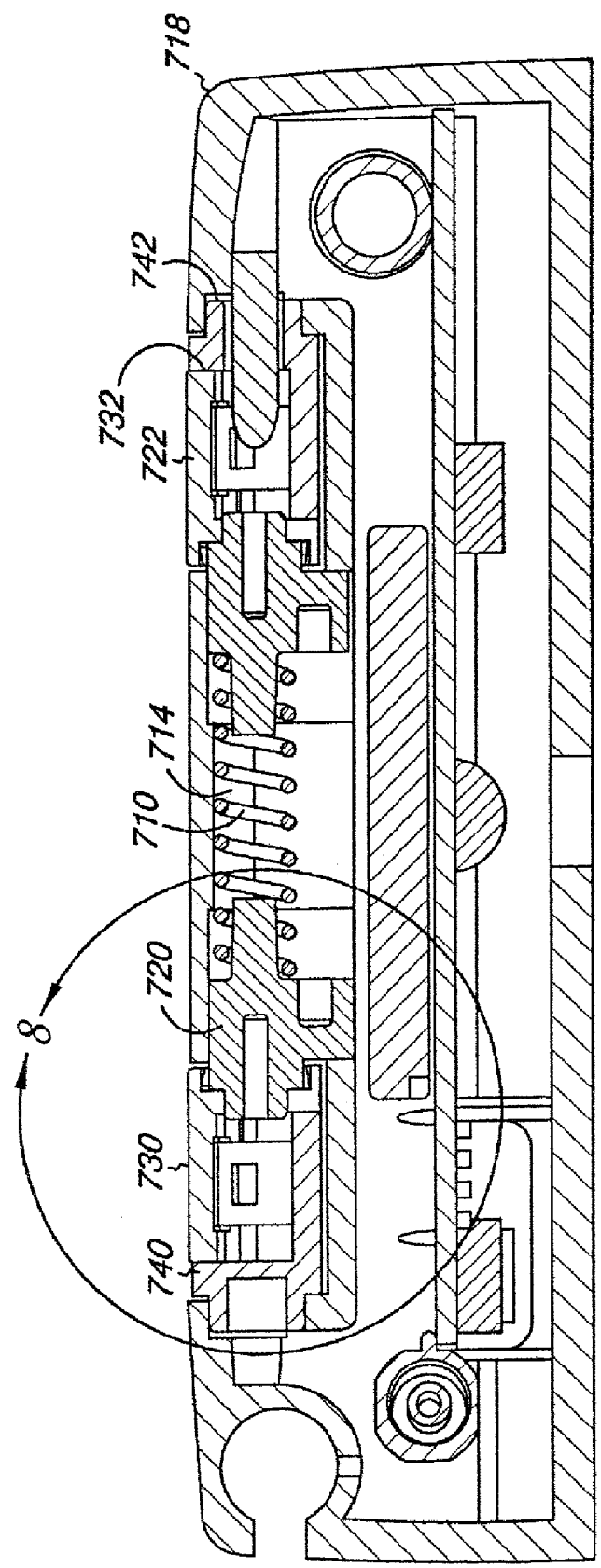
FIG. 7 is a cross-sectional view of a portion of the housing and subhousing of the movable patch antenna associated with the hand-held, multi-function electronic device shown along line 7-7 in FIG. 5.

FIG. 7 is a cross-sectional view of a portion of the housing 718 and subhousing 714 which includes the patch antenna 714 associated with the hand-held, multi-functional electronic device 710. FIG. 7 is a cross section along line 7-7 in FIG. 5. FIG. 7 provides further detail of the hinge 700. The hinge mechanism 700 includes a spring 710 and a first spring loaded detent 720 and a second spring loaded detent 722. Associated with each spring loaded detent 720, 722, is a cam follower 730, 732. The hinge 700 also includes a first end piece 740 and a second end piece 742 which engages openings within the housing 718.

Figure 8:
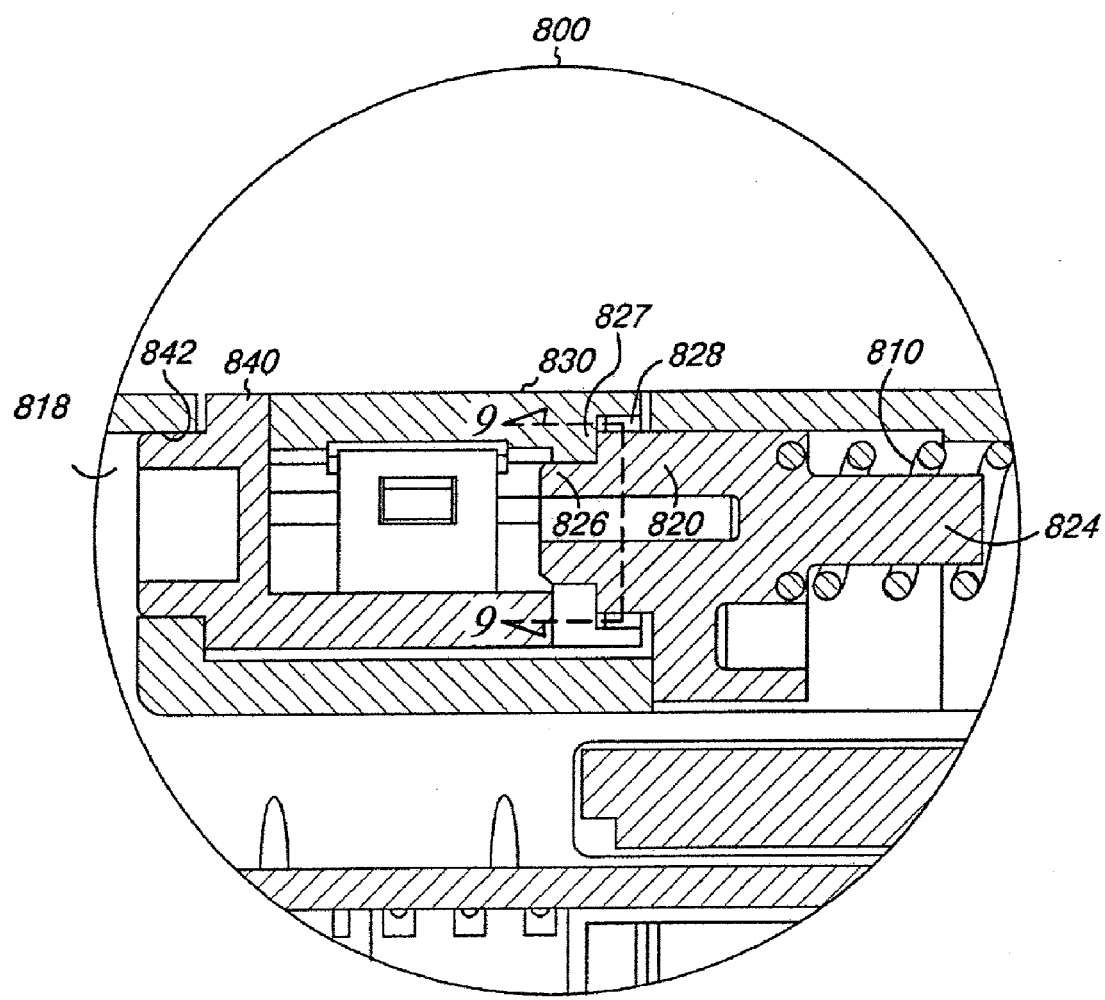
FIG. 8 is a detailed view of a portion of the housing and subhousing of the flip antenna associated with the hand-held, multi-function electronic device shown in FIG. 7.

FIG. 8 shows further detail of one side of the hinge 800 which corresponds to a blown-up portion shown in FIG. 7. FIG. 8 will be used to further detail the hinge mechanism 800. One side of the hinge 800 will be discussed. Specifically, the side of hinge shown in FIG. 8 will be discussed, and it should be noted that the other side of the hinge 800 is similar. Rather than discuss both sides of the hinge 800, one side is discussed for the sake of clarity. The spring loaded detent 820 includes a first end 824 and a second end 826. The second end includes a shoulder 827, as well as a cam 828. The second end 826, shoulder 827, and cam 828 engage the cam follower 830. The cam follower 830, in turn, engages the end 840 of the hinge 800, which engages the housing 818. The spring 810 fits over the first end 824 of the spring loaded detent 820. The spring is positioned to produce a force at both ends of the hinge. The force acts through the spring loaded detent 820, the cam follower 830, and the end piece 840 so as to produce a force at the opening 842 in the housing 818. Therefore, the spring produces a compressive force which forces the end of the hinge 840 into the opening 842. The spring produces a friction force at the end 840 that rotates within the opening 842 of the housing. This is very advantageous to have the hinge 800 be spring loaded using the spring 810. This spring loading provides a compressive force between the hinge 800 and specifically the end 840, and the housing 818, and specifically the opening 842 within the housing. This is particularly significant when the portable hand-held device is being used in an environment that has vibration. One such environment that may be prone to having vibration is within a car. Older cars may vibrate or even newer cars may pass over terrain that imparts vibration to the interior surface of the car. One such terrain might be a washboard surface on a gravel road or chuck holes in the road or any number of road irregularities. The spring 810 of the hinge 800 produces a force to keep the hinge 800 at a specific location. The spring 810 imparts a force so that there is friction between the end 840 and the opening 842 within the housing 818. The friction produces a force which resists movement of the subhousing (as described above in FIG. 6) with respect to the housing 818, especially in environments that might have vibration. The hinge 800, and specifically the spring loaded detent 820, includes a cam surface 828. The cam surface 828 includes a couple of lobes with detents therein.

Yet another feature of the hinge 800 is the fact that it includes a hollow opening within the hinge. The hollow opening is sized so that a connector between an antenna (as shown in FIG. 6) located inside of the housing 818 can pass through the opening within the hinge 800. This provides for a much cleaner design which is less prone to failure since the connector or cable needed to connect the antenna with the hardware within the housing 818 is not exposed. Not only is the design cleaner, but it also provides for a more reliable and robust design since the user is not able, or less able, to inadvertently damage this connector. In various embodiments, the connector can include a coaxial cable connector.

Figure 9:
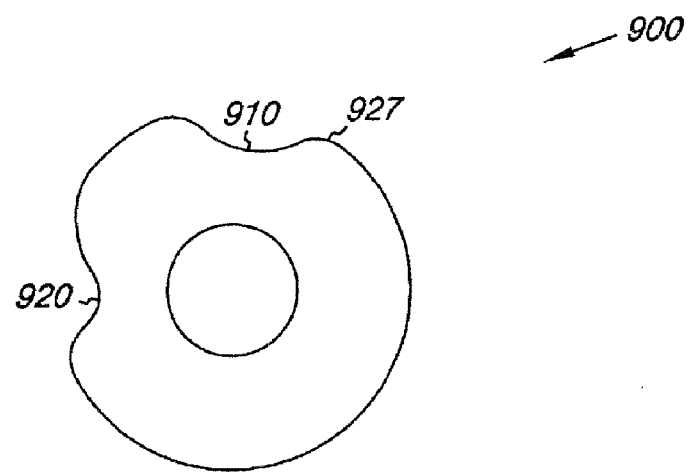
FIG. 9 is a cross-sectional view of the cam surface associated with the hinge between the housing and subhousing.

FIG. 9 illustrates an embodiment of a cam 900 taken along cut-line 9-9 in FIG. 8. The invention is not limited to the cam 900 embodiment shown in FIG. 9. Various embodiments include any cam member, associated with a hinge between a housing and a subhousing containing a GPS antenna according to the various embodiments, which is operable to cause a pivotally attached subhousing to tend toward one or more particular positions including the first position and the one or more second positions as the same have been described herein.

As shown in the embodiment of FIG. 9, the cam 900 includes a cam surface 927 operable in association with a spring-loaded detent, as described in FIG. 8 or otherwise, to engage a cam follower. The cam surface 927 includes a first detent 910 and a second detent 920. The first detent 910 is positioned so that the subhousing as it is rotated with respect to the housing will stop in a first position, which is approximately 110° from the backside surface of the multi-functional device. FIG. 3 shows the subhousing in such a position with respect to the housing. The second detent 920 will tend to position the subhousing 940 at a position which is essentially 180° from the stowed position, as shown in FIG. 4. The detents 910, 920 are helpful in that they provide for preferred open positions of the subhousing with respect to the housing. The detents 910 and 920 are selected so that the patch antenna within the subhousing will be in a preferred orientation in a certain unit so that it will maximize reception of signals from various satellites associated with a GPS system. Although only two detents 910, 920 are shown, it should be noted that more detents could be used if there were other positions of the subhousing with respect to the housing that may be preferred.

FIGS. 2A-2C, and 3-9 are provided as illustrative examples of hardware components for a portable, hand-held, multifunction device that includes a navigational device according to the teachings of the present invention. It should be appreciated that other suitable designs for a hardware device would also be within the scope of the present invention.

Figure 10A:
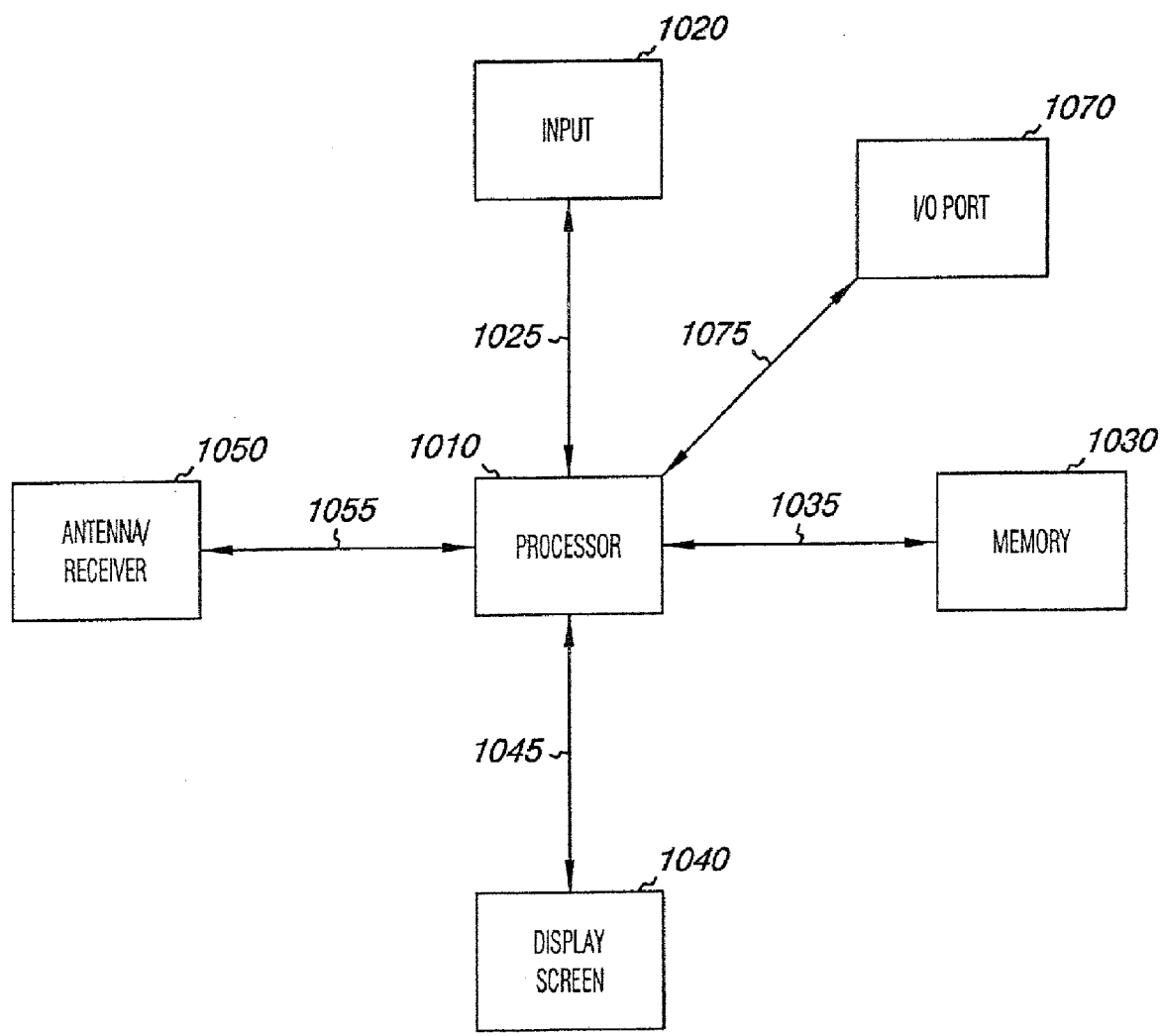
FIG. 10A is a block diagram of one embodiment for the electronic components within the hardware of FIGS. 2A-2C according to the teachings of the present invention.

FIG. 10A is a block diagram of one embodiment for the electronic components within the hardware of FIGS. 2A-2C, such as within housing 1018 and utilized by the electronic navigational device. In the embodiment shown in FIGS. 2A-2C, the electronic components include a processor 1010 which is connected to input, such as keypad 1020 via line 1025. Processor 1010 communicates with memory 1030 via line 1035. Processor 1010 also communicates with display screen 1040 via line 1045. An antenna/receiver 1050, such as a GPS antenna/receiver is connected to processor 1010 via line 1055. The electronic components further include I/O ports 1070 connected to processor 1010 via line 1075.

Figure 10B:
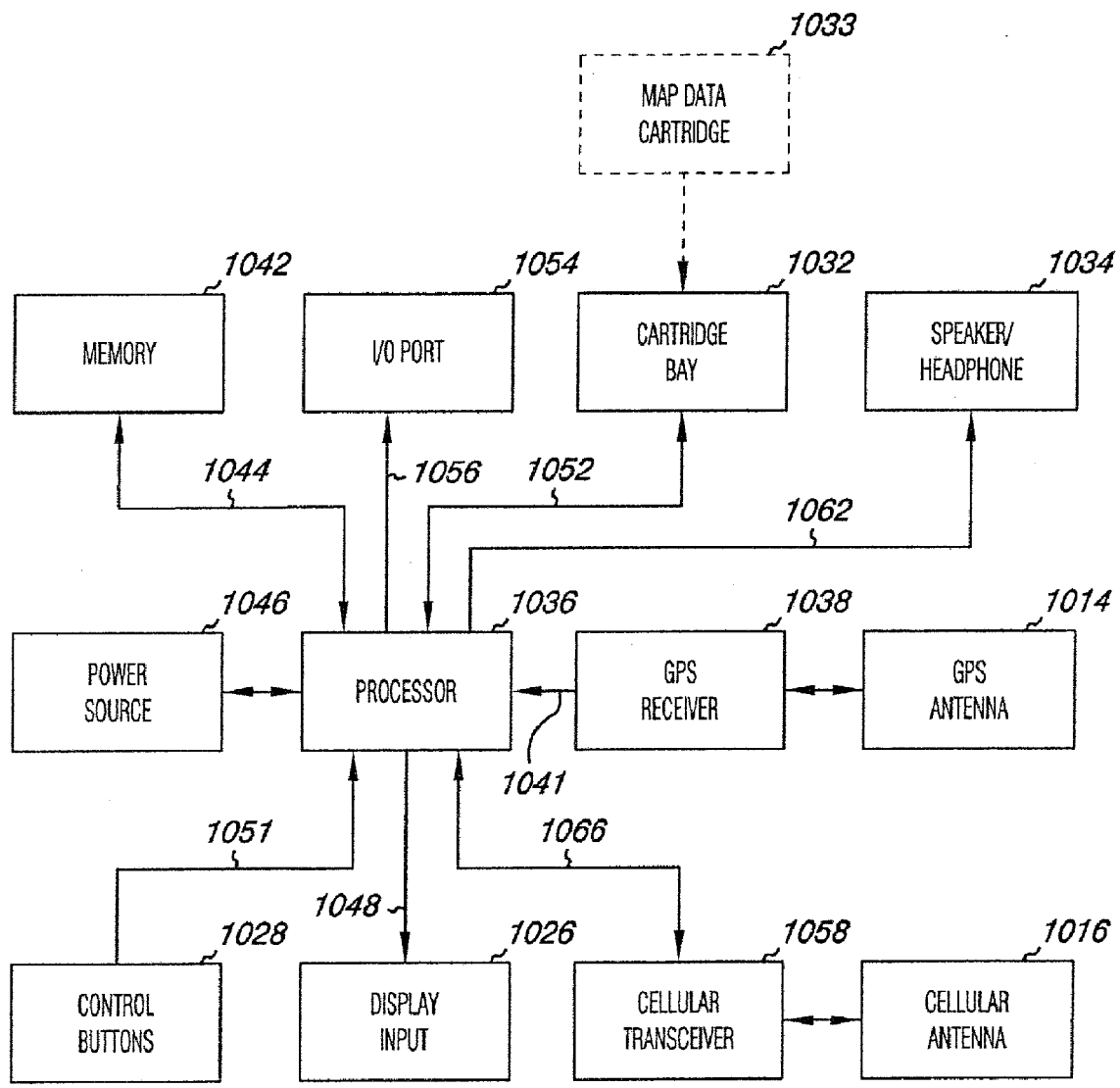
FIG. 10B is a block diagram of one embodiment for the electronic components within the hardware of FIGS. 2A-2C according to the teachings of the present invention.

FIG. 10B is a block diagram of one embodiment for the electronic components within the hardware of FIGS. 2A-2C and utilized by the GPS integrated multi-functional, electronic 1010 according to the teachings of the present invention. The electronic components shown in FIG. 10B include a processor 1036 which is connected to the GPS antenna 1014 through GPS receiver 1038 via line 1041. The processor 1036 interacts with an operating system (such as PalmOS; Pocket PC, an others) that runs selected software depending on the intended use of the multi-functional, electronic 1010. Processor 1036 is coupled with memory 1042 such as RAM via line 1044, and power source 1046 for powering the electronic components of PDA 1010. The processor 1036 communicates with touch sensitive display screen 1026 via data line 1048.

The electronic components further include two other input sources that are connected to the processor 1036. Control buttons 1028 are connected to processor 1036 via line 1051 and a map data cartridge 1033 inserted into cartridge bay 1032 is connected via line 1052. A conventional serial I/O port 1054 is connected to the processor 1036 via line 1056. Cellular antenna 1016 is connected to cellular transceiver 1058, which is connected to the processor 1036 via line 1066. Processor 1036 is connected to the speaker/headphone jack 1034 via line 1062. The PDA 1010 may also include an infrared port (not shown) coupled to the processor 1036 that may be used to beam information from one PDA to another.

As will be understood by one of ordinary skill in the art, the electronic components shown in FIGS. 10A and 10B are powered by a power source in a conventional manner. As will be understood by one of ordinary skill in the art, different configurations of the components shown in FIGS. 10A and 10B are considered within the scope of the present invention. For example, in one embodiment, the components shown in FIGS. 10A and 10B are in communication with one another via wireless connections and the like. Thus, the scope of the navigation device of the present invention includes a portable electronic navigational aid device.

According to the teachings of the present invention, the electronic components embodied in FIGS. 10A and 10B are adapted to provide an electronic navigational aid device with efficient route path generation and communication. That is, according to the teachings of the present invention a processor 1010 is provided with the electronic navigational aid device. A memory 1030 is in communication with the processor. The memory 1030 includes cartographic data, a current device location, and a generated route to a desired destination stored therein. The cartographic data include data indicative of thoroughfares of a plurality of types. A display 1040 is in communication with the processor 1010 and is capable of displaying the cartographic data to a user. The electronic navigational aid device processes a user's travel along the generated route using a set of processing algorithms and cartographic data stored in memory to operate on signals (e.g., GPS signals, received from the antenna/receiver 1050 or any wireless signals) as the same will be known and understood by one of ordinary skill in the art upon reading this disclosure.

As shown in FIGS. 10A and 10B, the device further includes a display 1040 in communication with the processor 1010 and the memory 1030. The display 1040 is adapted to display maps and routes associated with a navigational device.

It will be readily appreciated that the various electrical components shown in FIGS. 10A and 10B need not be physically connected to one another since wireless communication among the various depicted components is permissible and intended to fall within the scope of the present invention.

Figure 11:
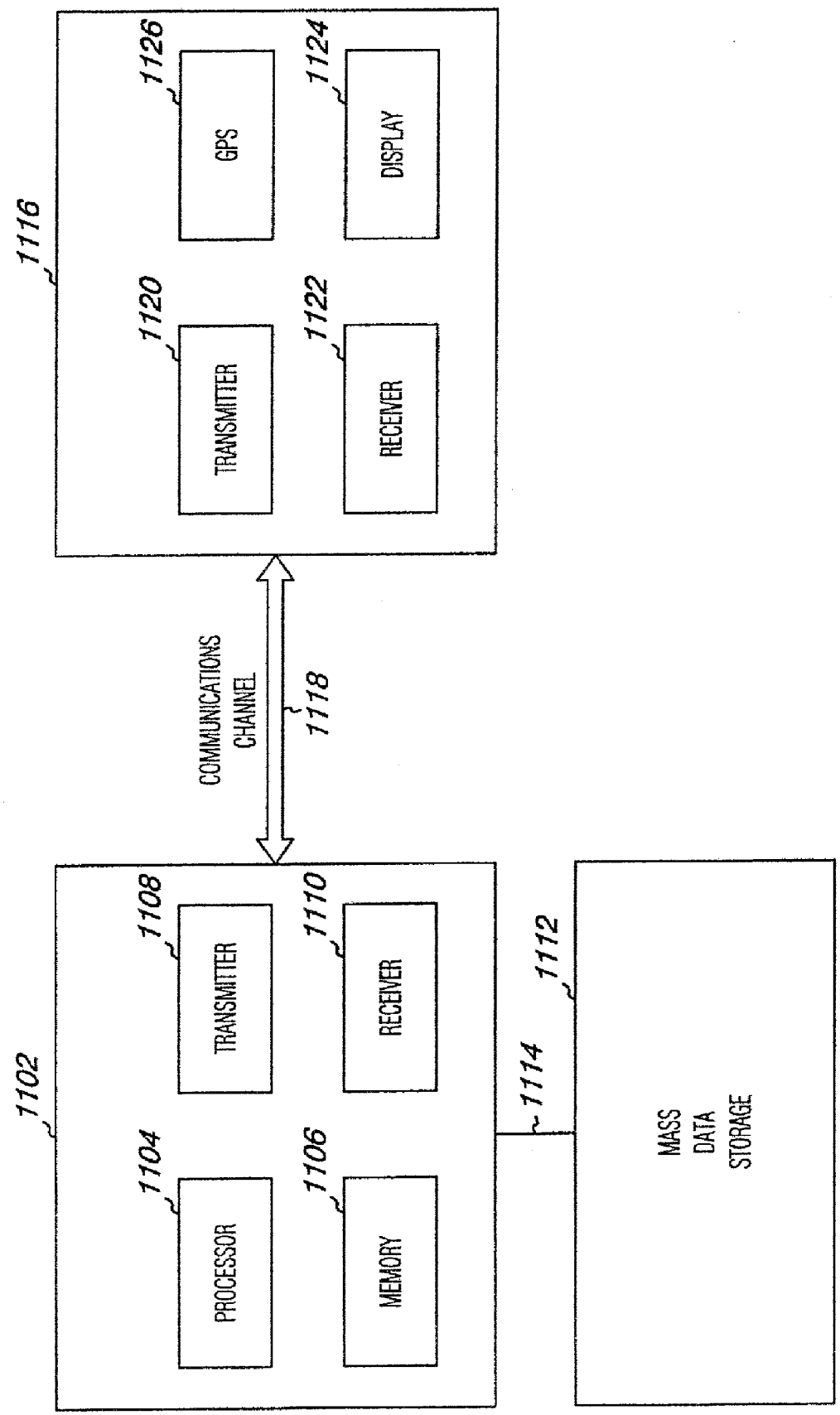
FIG. 11 is a block diagram of a navigation system according to the teachings of the present invention.

FIG. 11 is a block diagram of an embodiment of a navigation system according to the teachings of the present invention. The navigation system includes a server 1102. According to one embodiment, the server 1102 includes a processor 1104 operably coupled to memory 1106, and further includes a transmitter 1108 and a receiver 1110 to send and receive communication signals. The transmitter 1108 and receiver 1110 are selected or designed according to the communication requirements and the communication technology used in the communication design for the navigation system. The functions of the transmitter 1108 and the receiver 1110 can be combined into a single transceiver.

The navigation system further includes a mass data storage 1112 coupled to the server 1102 via communication link 1114. The mass data storage 1112 contains a store of navigation data. One of ordinary skill in the art will understand, upon reading and comprehending this disclosure, that the mass data storage 1112 can be separate device from the server 1102 or can be incorporated into the server 1102.

The navigation system further includes a navigation device 1116 adapted to communicate with the server 1102 through the communication channel 1118. According to one embodiment, the navigation device 1116 includes a processor and memory, as previously shown and described with respect to the block diagrams of FIGS. 10A and 10B. Furthermore, the navigation device 1116 includes a transmitter 1120 and receiver 1122 to send and receive communication signals through the communication channel 1118. The transmitter 1120 and receiver 1122 are selected or designed according to the communication requirements and the communication technology used in the communication design for the navigation system. The functions of the transmitter 1120 and receiver 1122 can be combined into a single transceiver.

Software stored in the server memory 1106 provides instructions for the processor 1104 and allows the server 1102 to provide services to the navigation device 1116. One service provided by the server 1102 involves processing requests from the navigation device 1116 and transmitting navigation data from the mass data storage 1112 to the navigation device 1116. According to one embodiment, another service provided by the server 1102 includes processing the navigation data using various algorithms for a desired application, and sending the results of these calculations to the navigation device 1116.

The communication channel 1118 is the propagating medium or path that connects the navigation device 1116 and the server 1102. According to one embodiment, both the server 1102 and the navigation device 1116 include a transmitter for transmitting data through the communication channel and a receiver for receiving data that has been transmitted through the communication channel.

The communication channel 1118 is not limited to a particular communication technology. Additionally, the communication channel 1118 is not limited to a single communication technology; that is, the channel 1118 can include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 1118 includes telephone and computer networks. Furthermore, in various embodiments, the communication channel 1116 is capable of accommodating wireless communication such as radio frequency, microwave frequency and infrared communication, and the like. Additionally, according to various embodiments, the communication channel 1116 accommodates satellite communication.

The communication signals transmitted through the communication channel 1118 include such signals as may be required or desired for a given communication technology.

For example, the signals can be adapted to be used in cellular communication technology, such as time division multiple access (TDMA), frequency division multiple access (FDMA), code division multiple access (CDMA), global system for mobile communications (GSM), and the like. Both digital and analog signals can be transmitted through the communication channel 1118. According to various embodiments, these signals are modulated, encrypted and/or compressed signals as can be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory. Moreover, as one skilled in the art will readily appreciate the mass storage need not be a single device as a plurality of storage devices can be logically associated to form a distributed mass storage device of the present invention.

According to one embodiment of the navigation system, the 1102 server includes a remote server accessed by the navigation device 1116 through a wireless channel. According to other embodiments of the navigation system, the server 1102 includes a network server located on a local area network (LAN), wide area network (WAN), a virtual private network (VPN) and server farms.

According to another embodiment of the navigation system, the server 1102 includes a personal computer such as a desktop or laptop computer. In one embodiment, the communication channel 1118 is a cable connected between the personal computer and the navigation device. According to one embodiment, the communication channel 1118 is a wireless connection between the personal computer and the navigation device 1116.

FIG. 11 presents yet another embodiment for a collective set of electronic components adapted to the present invention. As one of ordinary skill in the art will understand upon reading this disclosure, the navigation system of FIG. 11 is adapted to the present invention in a manner distinguishable from that described and explained in detail in connection with FIGS. 10A and 10B.

The mass storage device 1112 connected to the server can include volumes more cartographic and route data than that which is able to be maintained on the navigational device 1116 itself. In this embodiment, the server 1102 processes the majority of a user's travel along the route using a set of processing algorithms and the cartographic and route data stored in memory 1112 and can operate on signals, e.g. GPS signals, originally received by the navigational device 1116. Similar to the navigational device of FIG. 10, the navigation device 1116 in system 1100 is outfitted with a display 1124 and GPS capabilities 1126.

It should be noted that the electronic components of device 1000 shown in FIG. 10 and components of the system 1100 shown in FIG. 11 can be embodied as computer hardware circuitry or as a computer-readable program, or a combination of both. In another embodiment, system 1100 is implemented in an application service provider (ASP) system.

More specifically, in the computer-readable program embodiment, the programs can be structured in an object-orientation using an object-oriented language such as Java, Smalltalk, C++, and others, and the programs can be structured in a procedural-orientation using a procedural language such as C, PASCAL, and others. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI).

Of course it is readily appreciated by those skilled in the art that any programming methodology, programming language, programming interface, operating system, or computing environment, now known or hereafter developed can be readily deployed, without departing from the tenets of the present invention and all such implementation specific embodiments are intended to fall within the broad scope of the present invention.

CONCLUSION

In summary, disclosed is a multi-function, hand-held portable electronic device including a housing, a processor located within the housing, a memory in communication with the processor, and a display in communication with the processor. The display is positioned on a surface of the housing. The electronic device includes a display in communication with the processor and positioned on a surface of the housing. The electronic device includes an apparatus for performing a first function, and an apparatus for performing a second function. One of the functions includes a navigational component. The navigational component includes an antenna attached to the housing and movable between a stowed position and a signal acquisition position. A deployment indicator indicates the antenna is in the signal acquisition position. An operational component of the navigational component is activated in response to the deployment indicator indicating the antenna is in the signal acquisition position.

The multi-function, portable, hand-held device is also part of a navigational system. The navigation system includes a mass storage device adapted to store navigation data, a server adapted to communicate with the mass storage, and a portable, multi-function electronic device.

The invention provides for a single device having a navigational component and one or more other functions, such as a PDA function or a cellular phone function. The portable, hand-held electronic device is user friendly since one function switches to another essentially automatically. The portable, hand-held electronics device includes a power savings mode so that the user is not continually recharging the device rather than using it. The device is small enough that it is handy to use and stores in a pocket or purse. The device includes a GPS or other navigational device with other devices. The GPS antenna is low profile and is positionable to more than one position so that the device can operate in a hand-held orientation or in a car-mounted orientation. The device is durable, and free of wires routed externally about the housing. Routing the connector between the antenna and hardware within the case provides for a neat, uncluttered design.

The above systems, devices and methods have been described, by way of example and not by way of limitation, with respect to reducing memory capacity requirements, increasing processor throughput, and improving overall ease of user interaction with a navigation device. That is, the systems, devices, functional data, and methods provide for generating a projected route in connection with a navigational device which is more efficient and accurate than current systems, devices, and methods, without requiring more expensive system resources. The systems, devices, functional data, and methods of the present invention offer an improved generated projected route which provide more understandable, accurate and timely capabilities in a navigation device while utilizing less resources.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices, functional data, and methods are used. The scope of the invention should be determined with reference to the appended claims, along with the full scope of equivalents to which such claims are entitled.

What is claimed is:

1. A hand-held device comprising:
   a housing;
   a processor located within the housing;
   a memory in communication with the processor;
   a display in communication with the processor and the memory;
   a first component operable to perform one or more personal digital assistant (PDA) functions;
   a second component operable to perform one or more navigation functions;
   an antenna located in a subhousing which is pivotally attached to the housing and movable between a stowed position, wherein a rear of the subhousing is substantially flush with a rear of the housing, and a signal acquisition position; and
   a Hall Effect switch associated with the housing to control switching between the first and the second component based on a position of the antenna.

2. The hand-held device of claim 1, wherein the housing includes a detection mechanism for the Hall Effect switch, and wherein the subhousing includes a magnet which opposes the detection mechanism when the subhousing is in the stowed position.

3. The hand-held device of claim 2, wherein the Hall Effect switch provides a first signal when the subhousing is in a first position and wherein the Hall Effect switch provides a second signal when the subhousing is in one or more second positions.

4. A hand-held electronic device, comprising:
   a housing;
   a processor located within the housing;
   a memory in communication with the processor;
   a display in communication with the processor and memory;
   a first component operable to perform one or more personal digital assistant (PDA) functions;
   a second component operable to perform one or more navigation functions;
   a Hall Effect switch associated with the housing to control switching between the first and the second component; and
   an antenna pivotally attached to the housing and operable to trigger the Hall Effect switch, wherein the antenna may be rotated to a first position in which the antenna is substantially flush with a rear side of the housing.

5. The hand-held electronic device of claim 4, wherein the pivotally attached antenna is operable to trigger a first state when the pivotally attached antenna is in the first position.

6. The hand-held electronic device of claim 5, wherein the first state is operable to launch a set of computer executable instructions relating to the one or more PDA functions.

7. The hand-held electronic device of claim 6, wherein the one or more PDA functions include;
   a to-do list function;
   a calendar function; and
   an address book function.

8. The hand-held electronic device of claim 4, wherein the pivotally attached antenna is operable to trigger a second state when the pivotally attached antenna is in one or more second positions.

9. The hand-held electronic device of claim 8, wherein the second state is operable to launch a set of computer executable functions relating to the one or more navigation functions.

10. The hand-held electronic device of claim 9, wherein the one or more navigation functions include;
    a routing function;
    a location function; and
    a tracking function.

11. A personal digital assistant (PDA), comprising:
    a housing;
    a processor located within the housing;
    a memory located within the housing and in communication with the processor;
    a display located within the housing and in communication with the processor and memory;
    wherein the processor is operable to perform one or more PDA functions and one or more navigation functions;
    an antenna permanently and pivotally attached to the housing operable to control switching between the PDA functions and the navigation functions.

12. The PDA of claim 11, further including a Hall Effect switch to detect a position of the antenna.

13. The PDA of claim 11, wherein positioning the antenna in a first position causes the navigation functions to be disabled and positioning the antenna in one or more second positions causes the navigation functions to be enabled.

14. The PDA of claim 11, wherein the antenna is operable to trigger a first state when in a first position, wherein the first state is operable to launch a set of computer executable instructions relating to the one or more PDA functions, and wherein the one or more PDA functions include;
    a to-do list function;
    a calendar function; and
    an address book function.

15. The PDA of claim 11, wherein the antenna is operable to trigger a second state when in one or more second positions, wherein the second state is operable to launch a set of computer executable functions relating to the one or more navigation functions, and wherein the one or more navigation functions include;
    a routing function;
    a location function; and
    a tracking function.

* * * * *